United States Patent
Kraft et al.

(10) Patent No.: US 9,350,913 B2
(45) Date of Patent: May 24, 2016

(54) ASSISTED TEXT INPUT FOR COMPUTING DEVICES

(71) Applicant: A9.com, Inc., Palo Alto, CA (US)

(72) Inventors: Adam Wiggen Kraft, Mountain View, CA (US); Kathy Wing Lam Ma, San Francisco, CA (US); Xiaofan Lin, Palo Alto, CA (US); Arnab Sanat Kumar Dhua, Mountain View, CA (US); Yu Lou, Stanford, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 14/874,272

(22) Filed: Oct. 2, 2015

(65) Prior Publication Data

US 2016/0028945 A1 Jan. 28, 2016

Related U.S. Application Data

(63) Continuation of application No. 14/103,758, filed on Dec. 11, 2013, now Pat. No. 9,179,061.

(51) Int. Cl.

| H04N 5/232 | (2006.01) |
|---|---|
| H04N 7/18 | (2006.01) |
| G06K 9/18 | (2006.01) |
| G06T 15/08 | (2011.01) |
| G06F 17/27 | (2006.01) |
| G06F 3/0484 | (2013.01) |

(52) U.S. Cl.
CPC ........ H04N 5/23222 (2013.01); G06F 3/04842 (2013.01); G06F 17/2715 (2013.01); G06K 9/18 (2013.01); G06T 15/08 (2013.01); H04N 7/183 (2013.01); G06T 2215/16 (2013.01)

(58) Field of Classification Search
CPC .... H04N 5/23222; H04N 7/183; G06T 15/08; G06T 2215/16; G06K 9/18; G06F 17/2715; G06F 3/04842
USPC ........................................................ 348/207.1
See application file for complete search history.

(56) References Cited

U.S. PATENT DOCUMENTS

| 2009/0051962 A1 | 2/2009 | Asai et al. |
| 2011/0267490 A1 | 11/2011 | Goktekin et al. |
| 2012/0102552 A1 | 4/2012 | Sammon et al. |
| 2012/0300973 A1 | 11/2012 | Stone |
| 2013/0234945 A1 | 9/2013 | Goktekin |

OTHER PUBLICATIONS

Non Final Office Action dated Feb. 13, 2015, U.S. Appl. No. 14/103,758.
Notice of Allowance dated Jul. 13, 2015, U.S. Appl. No. 14/103,758.

*Primary Examiner* — Gevell Selby
(74) *Attorney, Agent, or Firm* — Hogan Lovells US LLP

(57) ABSTRACT

Various approaches provide for detecting and recognizing text to enable a user to perform various functions or tasks. For example, a user could point a camera at an object with text, in order to capture an image of that object. The camera can be integrated with a portable computing device that is capable of taking the image and processing the image (or providing the image for processing) to recognize, identify, and/or isolate the text in order to send the image of the object as well as recognized text to an application, function, or system, such as an electronic marketplace.

20 Claims, 7 Drawing Sheets

ASSISTED TEXT INPUT FOR COMPUTING DEVICES

CROSS-REFERENCE TO RELATED APPLICATIONS

This application is a continuation of U.S. patent application Ser. No. 14/103,758, filed on Dec. 11, 2013 of which the full disclosure of this application is incorporated herein by reference for all purposes.

BACKGROUND

As people are increasingly utilizing a variety of computing devices, including portable devices such as tablet computers and smart phones, it can be advantageous to adapt the ways in which people interact with these devices. For example, users are accustomed to manually inputting information into a portable computing device. This can include inputting a phone number to make a phone call, typing an email address to send an email, typing a web address into a web browser to view a web page, typing desired terms for a search, and the like. In some situations, users may desire to quickly and accurately obtain information related to products or other objects and provide that information to an application or system, such as an electronic marketplace. However, manually inputting information is often tedious and time consuming. Various approaches to save users time have been offered on various devices, however, these approaches do not sufficiently collect information related to a product or object. As technology evolves and as the features and services offered on portable computing devices evolve and expand, the ways shortcuts and other time saving methods are provided is changing.

BRIEF DESCRIPTION OF THE DRAWINGS

Various embodiments in accordance with the present disclosure will be described with reference to the drawings, in which.

DETAILED DESCRIPTION

Figure 1A:
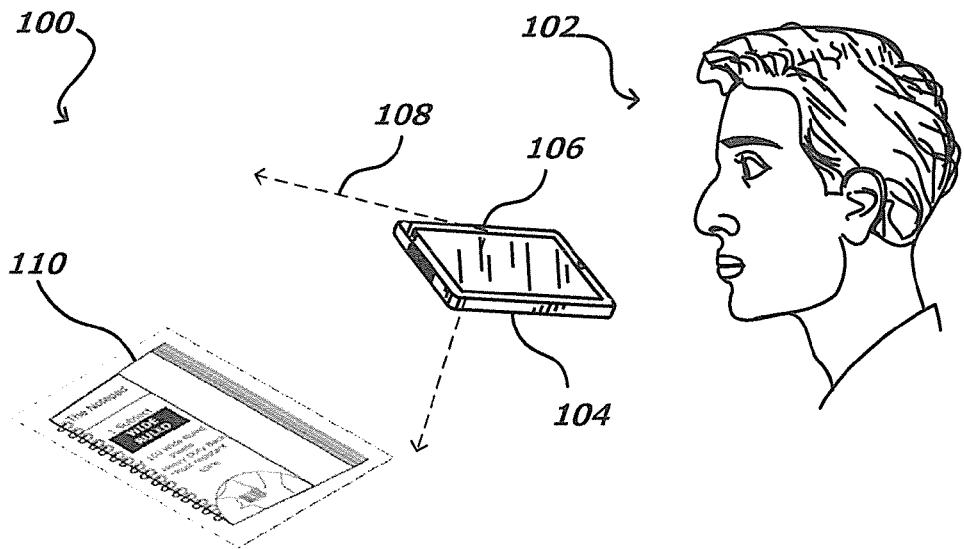
FIGS. 1A and 1B illustrates an example of using a portable computing device to capture an image of an object that can be utilized in accordance with various embodiments.

Systems and methods in accordance with various embodiments of the present disclosure overcome one or more of the above-referenced and other deficiencies in conventional approaches to providing input to, and/or receiving output from, an electronic device. In particular, various approaches provide for detecting and recognizing text to enable a user to perform various functions or tasks. For example, a user can point a camera at an object that includes text displayed thereon, in order to capture an image (or video) of that object. The camera can be integrated with a portable computing device that is capable of taking the image and processing the image (or providing the image for processing) to recognize, identify, and/or isolate the text in order to send the image of the object as well as the recognized text to an application, function, and/or system such as a database or an electronic marketplace.

Various approaches provide for an image preprocessing method to accelerate image processing and/or analysis tasks. For example, an image quality enhancement can automatically be applied to the image without intervention from a user. As discussed herein, image quality refers to qualities ideal for recognizing text, which are not necessarily synonymous with quality as seen or judged by a human. Accordingly, a computing device can analyze information, such as image or video information, captured by at least one camera of the device to identify object(s) contained, or otherwise represented, in the information. This can include, for example, text strings, bar codes, products, and other types of objects. Various embodiments can provide an interface that enables the user to provide input to an electronic device, such as enabling the user to fill out a product listing, form, or otherwise provide input using the identified objects.

For example, a user can use a camera of a computing device (e.g., a mobile phone, table, wearable computer, etc.) to acquire an image of an object. The image can be processed using one or more image processing algorithms, as may include image editing, segmentation, cropping, and contrast enhancement algorithms, among others, to improve the appearance of the acquired image. The processed image can be analyzed using one or more object character recognition (OCR) algorithms to recognize text in the image. Various other objects or content can be identified as well, such as barcodes, product labels, product names, etc. After the device has completed scanning the image, the recognized text is available to be used to fill in corresponding fields related to the object. For example, in the situation where the object is a product to be listed in an electronic marketplace, the recognized text can be used to fill in a title field, a search term field for the product, a product description field, etc. In this way, an interface, such as a word listing interface can be displayed that includes a selectable list of at least a subset of the recognized text. The interface can be a popup window, an overlay, a new page, or the like, containing the selectable subset of words. In various embodiments, stop words can be filtered out and omitted from the interface. Once the image, barcode, and/or text information has been collected and any text information filled in, the image and associated words can be stored in a database and/or provided to an application, function, and/or or system such as an electronic marketplace.

Various other applications, processes, and uses are presented below with respect to the various embodiments.

FIG. 1A illustrates an example situation 100 wherein a user 102 is interacting with a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 includes at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a notepad 110. The information can include, for example, information contained in or on the notepad or information about the notepad itself, among other such information. As described, the user may desire to submit an image of the notepad, as well as related information to an application, function, and/or system such as a database and/or an electronic marketplace.

Figure 1B:
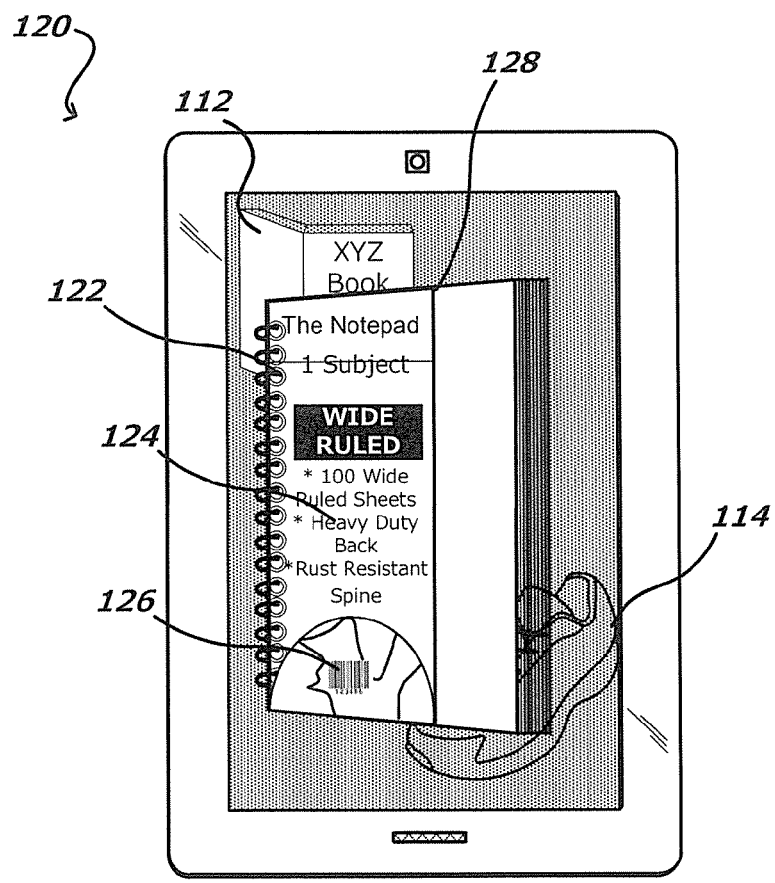

In this example, the notepad 110 contains information that might be of interest to the user. This information includes, for example, a body of text, a bar code, etc. As described, the user might want to acquire any or all of this information for any of a number of reasons, such as to submit an image of the notepad as well as information related to the notepad to an electronic marketplace. In order to obtain this information, the user can position the computing device 104 such that at least the relevant portion of the notepad 110 is within a field of view 108 of at least one camera 106 of the computing device. The resulting image can then be displayed on a display screen of the computing device, as illustrated in the example situation 120 of FIG. 1B. In various embodiments, the image 122 of the notepad can be a still image that was captured by the camera, or can be a frame of a "live" view as captured by a video mode of the camera, etc. As illustrated, the image 122 can include information associated with the notepad. Each instance of captured information can be referred to as an "object," which can be analyzed by software running on, or remote from, the device. In this example, the objects that can be recognized from the image can include objects such as a string of text 124, a barcode 126, and a title 128, etc. Various other types of objects can be detected in other examples as discussed and suggested elsewhere herein. The image can be processed to attempt to recognize the text, which then can be utilized by the user for any of a number of different purposes as will be described elsewhere herein.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm. Oftentimes, however, the image that is captured will not be of sufficient quality to recognize the object or any text associated with the object that is of interest to the user. For example, the image might be out of focus or blurry, or part of the image might be obscured. Further, sometimes the recognition algorithm will only be able to recognize a portion of the image, which may or may not include the portion that is of interest to the user. Since the user is uploading the image to a server, the user has to wait for the image to be uploaded and analyzed before determining whether the relevant information was recognized, and whether it was recognized properly. If not, the user must cause another image to be analyzed and hope that the desired result is returned. This process can be inefficient and potentially frustrating to a user. Further, in the situation of uploading the image to an electronic marketplace from a mobile device, it is often the case that images captured of a product from the device may not be cropped well or the image may contain a noisy background, instead of a clear, contrasting (white) background. This can be the case where the image of the notepad includes other objects not of interest to the user, such as a book 112 and a shoe 114. Further still, text input can difficult as it can be difficult to type large bodies of text from a mobile device, which makes typing things like the ingredients and nutrition facts from certain products problematic.

Accordingly, approaches in accordance with various embodiments can provide an interface that enables a user to determine which text or objects that have been recognized, such that the user can utilize the recognized text to fill in corresponding product fields related to the object, such as a title field, a search term field for the product, a product description field, and the like. Such an interface can indicate the text that has been recognized and can aggregate and organize the text. For example, a word listing interface can be displayed that includes a selectable list of at least a subset of the recognized words. Accordingly, the user is then enabled by the system, application, or computing device to select a combination of the words from the selectable list for use in performing at least one operation, which can at least include performing a search, copying text to a clipboard, notepad/word processing application, or browser, and/or filling in text fields, and the like. In at least some embodiments, the interface can enable providing the image and related text to an application, function, and/or system such as a database and/or electronic marketplace. Such an interface can be provided as part of the operating system, as part of the camera software/hardware, or as part of an application sitting on top of the camera stack, among other such options.

Figures 2A, 2B:
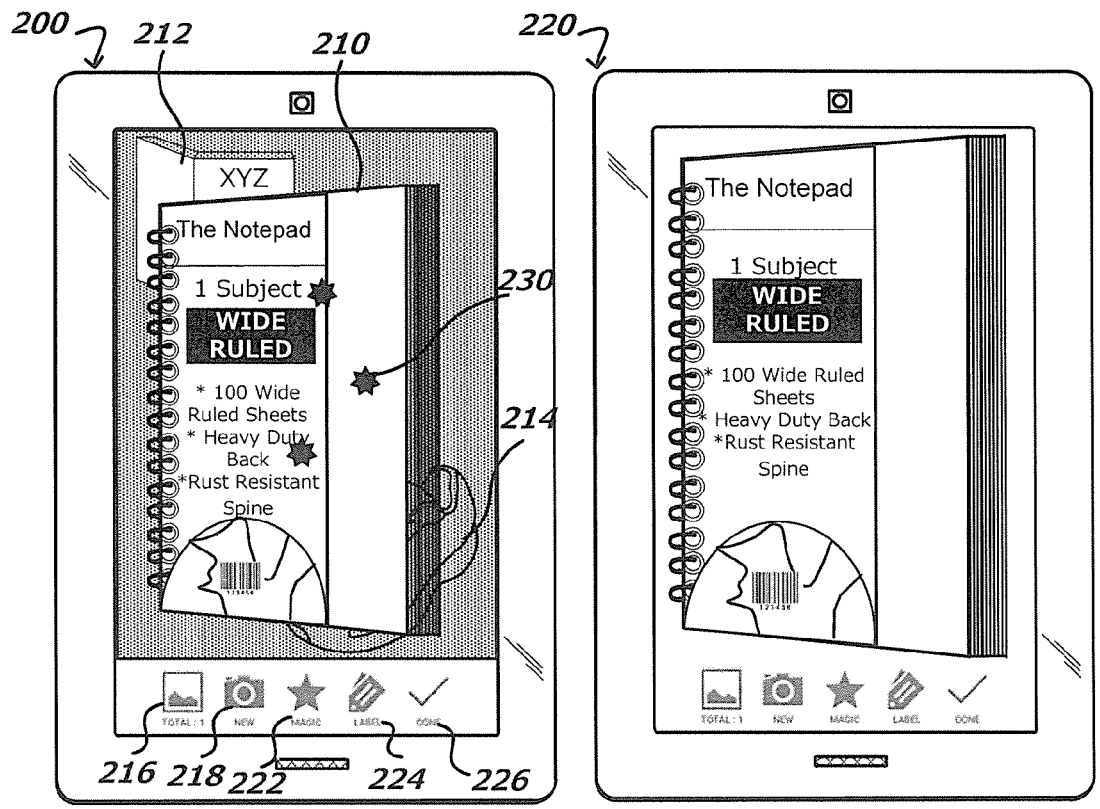
FIGS. 2A, 2B, and 2C illustrate example views of a user interface of a computing device that conveys to a user recognized text in an image, as well as image processing approaches that can be performed on the image, in accordance with various embodiments.
Figure 2C:
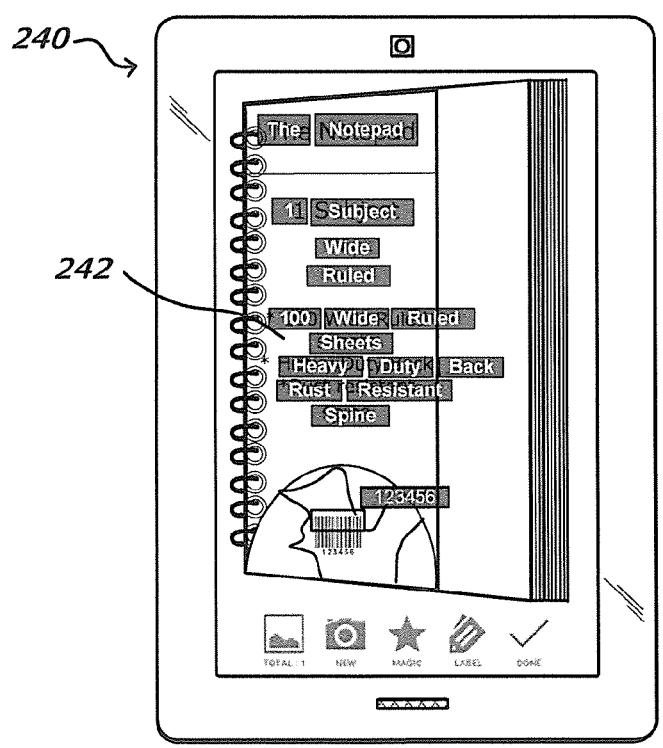

FIGS. 2A, 2B, and 2C illustrate example views of a user interface of a computing device that conveys to a user recognized text in an image, as well as image processing approaches that can be performed on the image, in accordance with various embodiments. As described, a user may desire to provide a listing of a product to an electronic marketplace. In some situations, the user may desire to include information associated with the product, such as a title of the product, a description of the product, and the like. Further, the user may desire a high quality image of the product for display, as may include an image with balanced color and brightness as well as an image cropped and centered around the object of interest to the user.

Accordingly, approaches herein can at least include an image capture stage, an image processing stage, a text scanning/recognition stage, a text input stage, and a product submission stage. During the image capture stage an image or video is captured of an object by at least one camera of the device. The image can be captured using a default camera application operating on the device and then provided to other software for processing of the image or captured using software operating on the device capable of running one or more image enhancement, recognition, and/or analysis algorithms on the image. As described, the image that is captured may not be of sufficient quality to recognize the object that is of interest to the user. For example, the image might be out of focus or blurry, or part of the image might be obscured. Further, sometimes the recognition algorithm will only be able to recognize a portion of the image, which may or may not include the portion that is of interest to the user. Accordingly, during the image processing stage the image can be enhanced. Once the image is enhanced, during the text scanning stage, the software can attempt to identify text or other objects within then image. The recognized text can be used to fill in information associated with the object during the text input stage. For example, during the text input stage, the identified text can be selected and used to fill in a number of fields useful for selling or otherwise providing the object as well as related text to an electronic marketplace. Thereafter, during the object submission stage, the user can submit the image as well as any text to an electronic marketplace.

FIG. 2A illustrates an example situation 200 wherein an image of a notepad 210 captured by a camera of a computing device is processed to accelerate image processing and/or analysis. In this example, the image includes other objects not of interest to the user, such as a book 212 and a shoe 214 located behind the notepad 210. Further, in various embodiments, the image may include defects, such as blemishes, specks, or various other imperfections 230. The representation of the object in the image may be off centered. Further still, the image made need adjustment/enhancement as may relate to at least one of a level of lighting in the image, a level of sharpness of the image, and a level of contrast of the image. Accordingly, the image can be provided to software operating on the device capable of using one or more image processing algorithms to process the image to accelerate the text scanning/recognition stage. Such processing algorithms can include image editing, segmentation, cropping, and contrast enhancement approaches, among others.

In accordance with various embodiments, the software interface can include a control panel or control ribbon that includes user-selectable elements configured to perform a function. For example, a first user-selectable element 216 labeled "Total" can be configured to indicate a number of images captured by at least one camera of the device, a second user-selectable element 218 labeled "New" can be configured to cause at least one camera of the device to operate, a third user-selectable element 220 labeled "Magic" can be configured to cause one or more image editing processes to be implemented on the captured images, a fourth user-selectable element 224 labeled "Label" can be configured to cause an image tagging interface to run, wherein the user can tag areas of the image, and a fifth user-selectable element 226 labeled "Done" can be configured to end at least the image capture and enhancement process. It should be noted that more or fewer user-selectable elements can be included on the control panel, wherein the elements can be associated with different functions and/or configured to perform different operations.

As shown in example situation 220 of FIG. 2B, upon receiving a selection of the third user-selectable element 222 (i.e., the Magic element), the software can automatically process and enhance the image. For example, the image can be processed using one or more image processing algorithms, as may include image editing, segmentation, cropping, and contrast enhancement algorithms, among others, to improve the appearance of the acquired image. For example, in accordance with an embodiment, an S-curve transformation can be applied to the image to improve contrast of the image to make the image appear crisper and sharper. The s-curve transformation can lighten highlight areas and darken shadow areas.

The image can be segmented. For example, in various embodiments, the object captured is assumed to be positioned such that the object is centered. In certain embodiments, this can be aided by a user interface that draws a center region or explicitly indicates to the user to center the object. Upon centering the object, one or more algorithms can be used to determine a foreground object, the foreground object corresponding to the object of interest. The segmentation algorithms can take advantage of knowing where the foreground object is located to segment the image into a foreground area and a background area. In response to segmenting the image, the background area is colored white or some other color.

The image can be cropped such that the object located in the foreground area takes up most of the image region. In should be noted that various other image processing steps can also be applied as well, as may include image rectification (e.g., correcting perspective distortion), upscaling, color enhancement, etc. Further, depending on the tradeoff between network bandwidth and mobile device speed, the image processing can occur on either the device or a networked server. Further still, in some embodiments, the user can perform one or more manual imaging editing functions. For example, although in this example selecting the third user-selectable element 222 automatically segments, crops, and brightens the image, as well as performs any number of other image enhancement approaches, the user can be provided a set of tools wherein the user can manually adjust the appearance of the captured images. Further, the user can use the fourth user-selectable element 224 to enabling a tagging interface wherein the user can tag the images with different information, such as title, or main-image, or left-view, etc.

As shown in example 240 of FIG. 2C, during the text scanning/recognition stage, the software can process the image to identify and aggregate text or other objects within then image. As described, the recognized text can be used in the text input stage to fill in any information associated with the object. In accordance with various embodiments, the identified text can be emphasized 242, as may be accomplished by highlighting, bolding, or otherwise modifying the appearance of the text. In various embodiments, identifying text can include, for example, using at least one optical character recognition (OCR) algorithm.

Further, in various embodiments, approaches can include scanning for barcodes while concurrently identifying and collecting words using at least one OCR algorithm. In various embodiments, the software can track between image frames and can store the state of objects observed in a live camera view with respect to a display screen of the device. In certain embodiments, the software can integrate results from multiple OCR decodes, while concurrently tracking text that is no longer on screen. The software can further update a confidence score for identified text as well as improve the accuracy of text currently being detected on the screen. Further, groupings of text can be tracked and these groupings of text can be distinguished from various other groupings of text. For example, a user can scan six different sides of a cereal box and the text aggregation can group the words from the six different sides together. At the end of a scanning stage, the device will write to memory and organize any barcodes as well as any groupings of text with the words embodied in the text blocks.

In certain embodiments, a plurality of cameras can acquire image and/or video information for use in determining additional information useful in presenting the object on, e.g., an electronic marketplace. In some embodiments, at least a pair of the plurality of cameras can be a stereo pair of cameras, where the stereo pair of cameras can be used to acquire stereo image and/or video information. As mentioned, the image information can be used to determine additional information as may include dimensions of the object, a three-dimensional (3D) representation of the object, images corresponding to multiple sides of the object (e.g., images corresponding to different viewpoints of the object), among others. Accordingly, disparity information determined from the image information acquired by the stereo pair of cameras can be used to determine the dimensions of the object and/or generate the 3D representation of the object. Various other 3D imaging/modeling approaches can be used as well, as may including using one or more 3D imaging sensors and/or algorithms. In some embodiments, the images corresponding to the different viewpoints of the object can be stitched together or otherwise combined using one or more image processing/enhancement algorithms. In this way, a 3D model of the object can be generated and/or viewpoints of the object can be provided, where each viewpoint can correspond to a different side (e.g., left side, right side, top, bottom) of the object. In should be noted that any 3D imaging sensor and/or algorithm known in the art can be used in the various approaches described herein.

Upon completion of the text scanning/recognition stage, the text is available to be used to fill in product fields related to the object, such as a title field, a search term field for the product, a product description field, etc. For example, FIGS. 3A, 3B, 3C, and 3D illustrate example views of a user interface of a computing device wherein a user can input text associated with an object, in accordance with various embodiments. As shown in example implementation 300 of FIG. 3A, an interface such as a word listing interface 302 can indicate the text that that has been recognized as being associated with a title and can organize and present the aggregated text for use in filling out a title field 304 of the object. As shown in example implementation 320 of FIG. 3B, the word listing interface can indicate the text that that has been recognized as being associated with a product description and can organize and present the aggregated text for use in filling out a product description field 306. As shown in example implementation 340 of FIG. 3C, the interface can indicate the text that that has been recognized as being associated with keywords and can organize and present the aggregated text for use in filling out a keyword search field 308.

In accordance with various embodiments, the word listing interface can include a selectable list of at least a subset of the recognized words, where the subset of the recognized words can include single words or groupings of words. In this way, a number of algorithms can be applied to filter out small or unwanted words, while grouping relevant words together.

In accordance with various embodiments, the subset of the recognized words can be presented to the user in a number of ways. The user can select a filter element 330, where the user be presented a number of ways to sort the words. For example, the user can select to sort the words alphabetically, by time in which they were detected, or by location on the object. In various embodiments, the words can be automatically organized based on, for example, a relevance score associated with each word or the words or groups of words can be manually organized by the user. Additionally, in certain embodiments, the user can also select the sort order of the words. The word listing interface in one example, can display the most recently recognized words of the text to the user, as well as a count of the total number of unique words recognized throughout a scanning session. Instead of the most recently recognized words, the software can calculate a relevance score for each word recognized in the image for how relevant a respective word is to the user by making inferences of the user's purpose or intent with respect to the object in the image. Various factors can be used to determine the relevance score for prioritizing or displaying the words in the word listing interface, such factors at least include a number of occurrences of a particular noun, previous visual searches, recognized product references or brand names, stated user preferences, user browser or purchase history, and the like. Accordingly, the recognized words can be displayed to the user in the word listing interface according to the determined relevance score.

The interface can be a popup window, an overlay, a new page, or the like, containing the selectable subset of words.

Figures 3A, 3B:
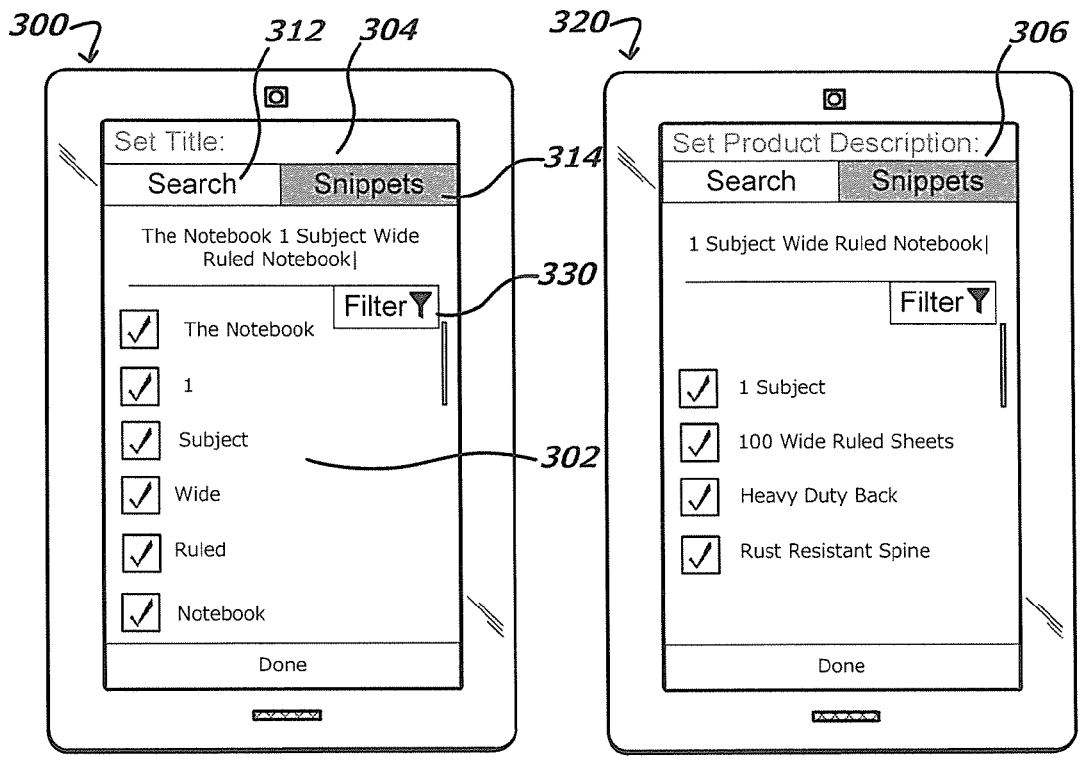
FIGS. 3A, 3B, 3C, and 3D illustrate example views of a user interface of a computing device wherein a user can input text, in accordance with various embodiments.
Figures 3C, 3D:
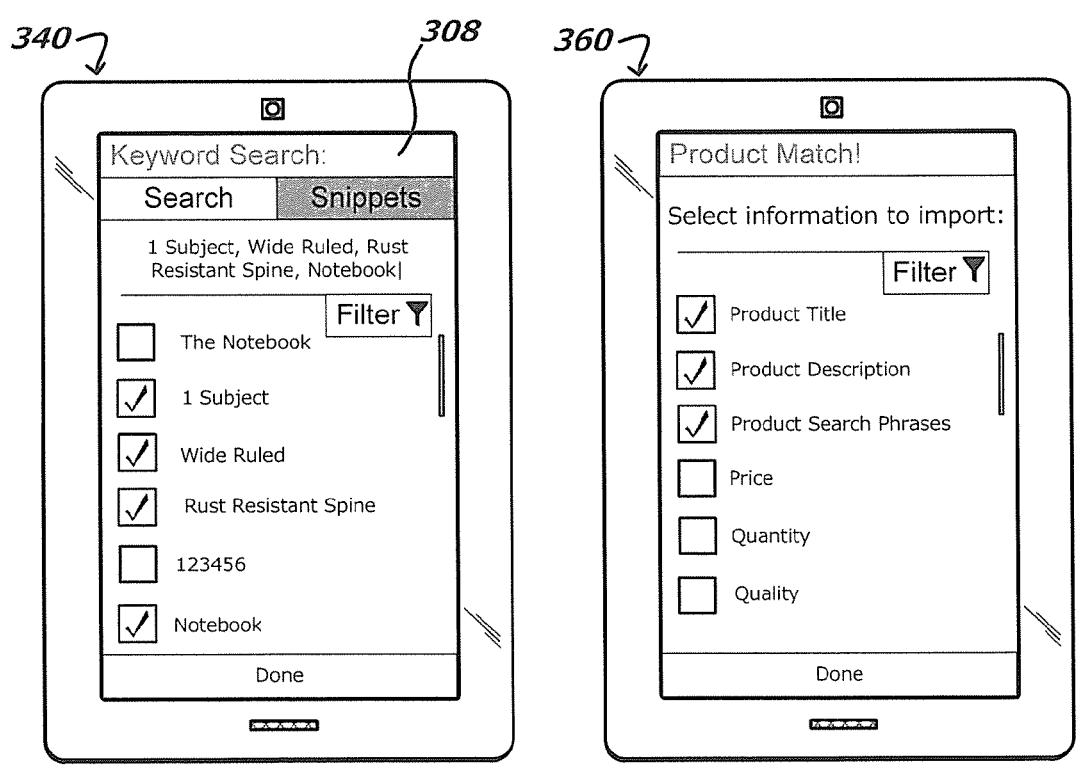

As illustrated in FIGS. 3A, 3B, and 3C, the word listing interface can include a "Search" tab 312 and a "Snippets" tab 314. The "Search" tab can be used by the user to search for particular words or groupings of words that may have been recognized. The "Snippets" tab can contain a list containing individual or groupings of words recognized. As discussed above, these words can be sorted by how meaningful they are to the user based on the same or similar relevance score or by most recently detected by OCR. The user can also use a keyboard of the computing device to change the contents of the list, which can allow them to correct for any mistakes the OCR results returns or the like. The list, thus, enables the user to select words appearing in a text of the description. The user can then use the contents of the list to perform any associated operations such as filling out text fields and other forms by selecting from a set of meaningful words.

In this way the user can select to input text from the content of the list into one the available text fields, where the content of the list is associated with a text field type. For example, a drop down menu can show the available text fields and for a particular text field a set of associated words can be displayed. In another example, a wizard or other guided tour can be provided to guide a user to available text fields. It should be noted that those skilled in the art will understand other approaches are possible as well.

In accordance with various embodiments, a number of text fields can be provided. For example, the user can select at least one of a title text field 302, a product description text field 304, a keyword search text field 306, among others. Below the text field can be a selection of words aggregated from the OCR algorithm, the words being related to a corresponding text field. The user can use the words as a reference, while adding or editing text as they need. As shown in FIG. 3A, the user can fill in the title text field. In this example, a user can select single words or word phrases from the list of words. As shown in FIG. 3B, the user can select words to fill in the product description. In this example, the text may be grouped in larger text blocks. The text blocks can be related text such as any words grouped together, nutritional information, cooking directions, product description, directions on how to use the product, warranty information, product care information, a parts list, among others. In this way, the user can select the larger text blocks instead of adding just single words one by one. In any situation, the user can select text corresponding to one of a plurality of text fields including, for example, a product title field, a product description field, a product search phrases field, keywords to be used to find the product category in an electronic marketplace field, a price field, a quantity field, a quality field, among others, to enter into the corresponding field.

In various embodiments, the software can provide assistance in filling in the fields. For example, the product category can be predicted either using in-device algorithm or a web service based on the entered keywords. For example, the recognized words "soothing soap" can lead to a particular product category, such as a "Beauty" category. The text can also be used to search the internet or electronic marketplace inventory to locate similar items to suggest a reasonable price.

In accordance with various embodiments, text extensions can be provided to understand the text being scanned and automatically cause the text identified to fill an appropriate text field. For example, the software can detect a list of ingredients and can automatically fill in the product's ingredient list without requiring further user input. Other examples can include automatically detecting and filling in nutrition facts, product hazards and warnings, dietary qualifications and certifications, origin of manufacture, target age group, etc.

In certain situations, some objects intended to be provided to the electronic marketplace may already exist in the marketplace. In accordance with various embodiments, embodiments described herein can advantageously identify objects already in an existing inventory of the electronic market place based at least in part on an image match, barcode identification, text that is already identified as being included in the inventory among other such information. Once the object is detected, the object's information can be directly imported. The user can adjust the information and provide additional information if needed. For example, the user can set a quantity and/or price. FIG. 3D illustrates situation 360 where the object was identified. In this situation, the user can select which information to import. As shown, the user has decided to import information corresponding to a product description, product search phrases, product title, and will provide price, quantity, and quality description.

Figure 4A:
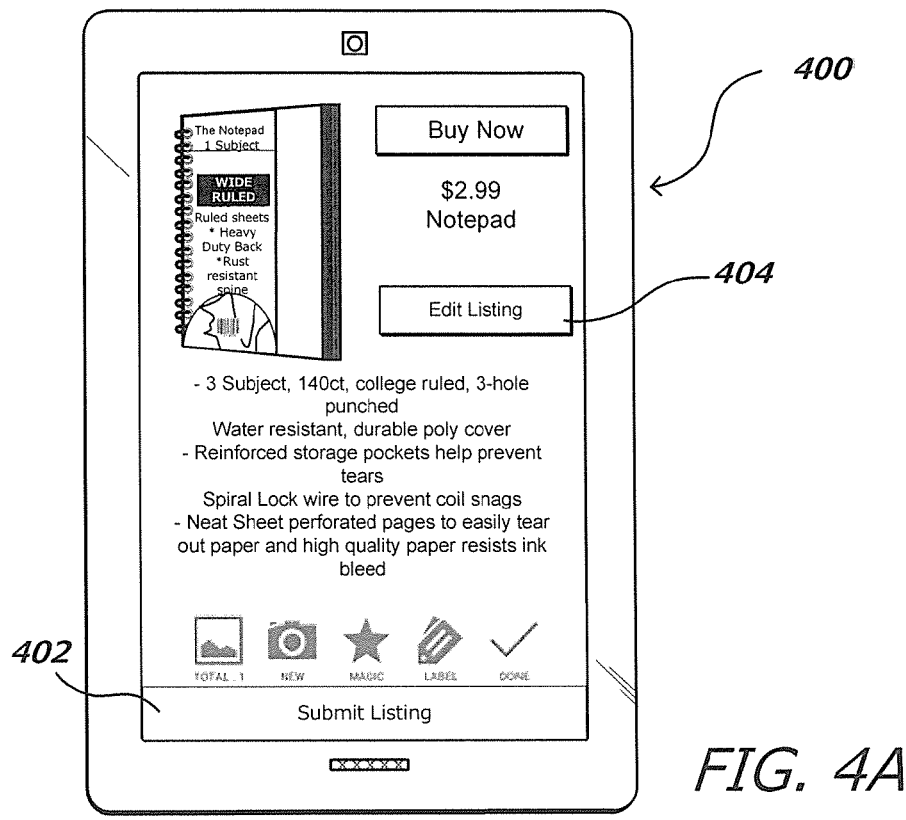
FIGS. 4A and 4B illustrate example views of a user interface that can be presented to a user, in accordance with an embodiment.
Figure 4B:
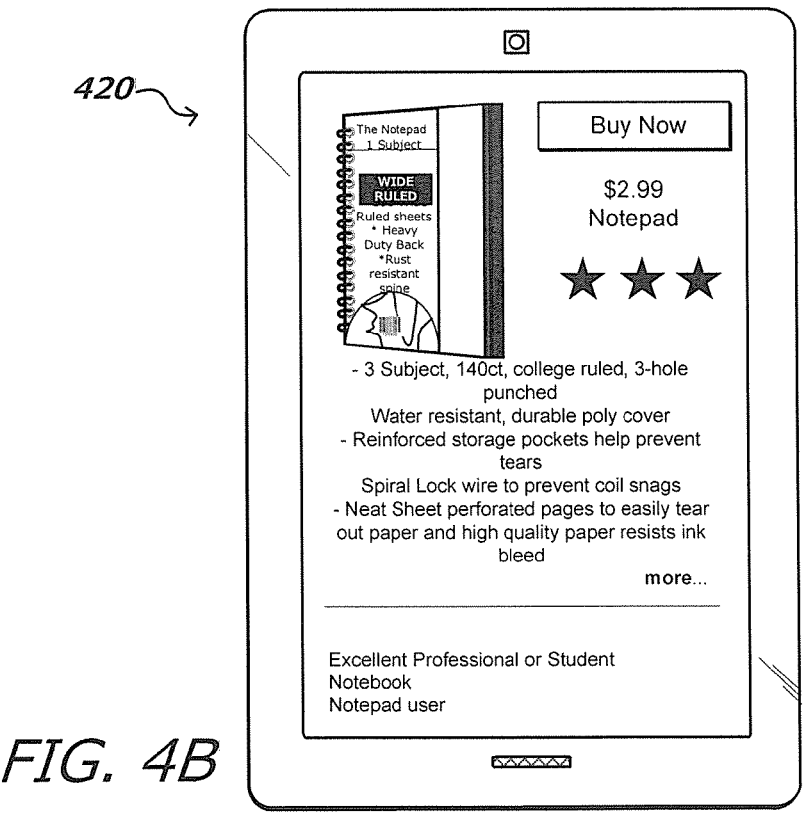

Once the image, barcode, and text information has been collected, and any text field completed, the image as well as the text can be provided to an application, function, and/or system such as a database an electronic marketplace. FIGS. 4A and 4B illustrate example views of a user interface that can be presented to a user to submit the object to an electronic marketplace, in accordance with an embodiment. As shown in example implementation 400 of FIG. 4A, the image of the notepad as well as corresponding text is provided for display so that the user can review the listing. In the product preview display, the user can select a "submit listing" element 402 to export the data to an existing system, such as a database or electronic marketplace, or the data can be emailed or otherwise saved as a file for later use. In this way, the device is not the only way to interact with the data. Alternatively, the user can edit the listing by selecting the "edit listing" element 404. In this way, the user can choose to do all of the collecting on the device, but can add or edit more text using the same or another device. Once the product is correctly photographed and tagged with text information, the user can submit the listing to, for example, an electronic marketplace, such as shown in the example implementation 420 of FIG. 4B.

Figure 5:
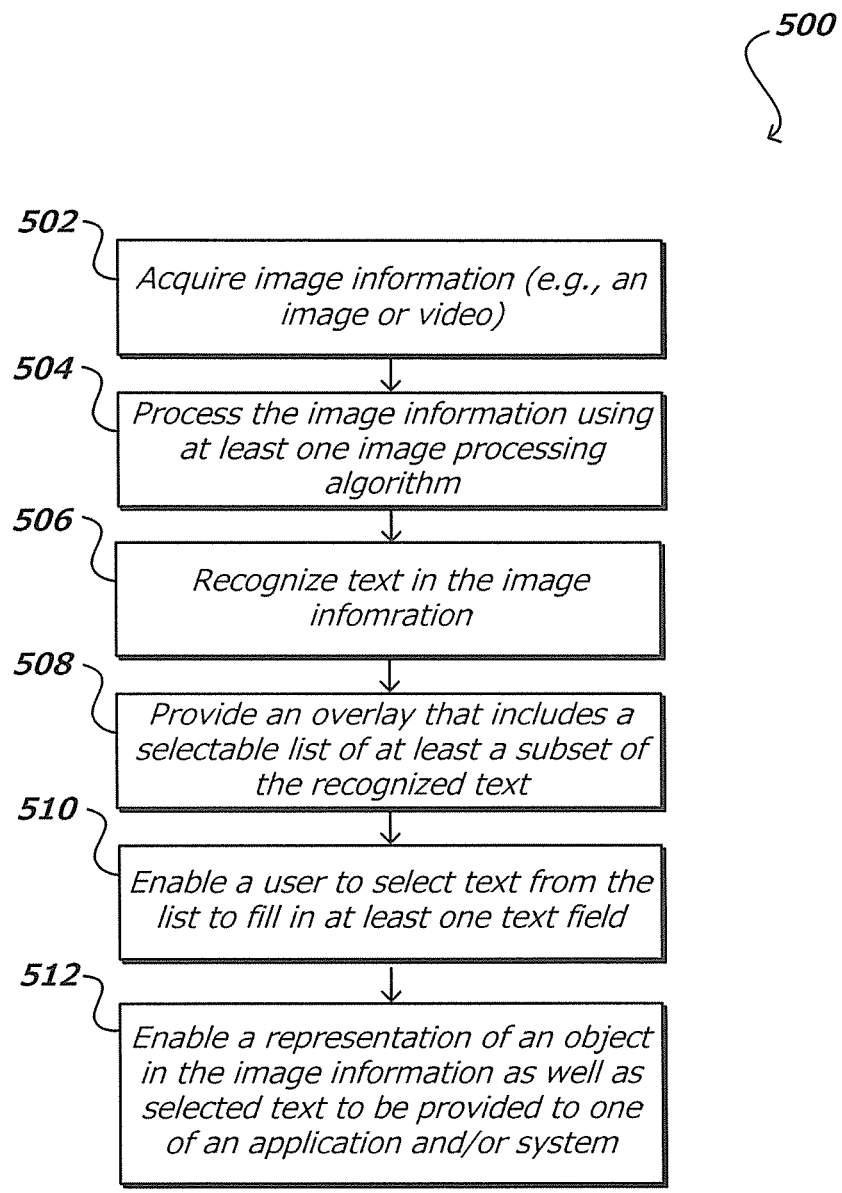
FIG. 5 illustrates an example process for enabling a user to interact with recognized text captured from an in accordance various embodiments.

FIG. 5 illustrates an example process for enabling a user to interact with recognized text captured from an in accordance various embodiments. It should be understood that there can be additional, fewer, or alternative steps performed in similar or alternative orders, or in parallel, within the scope of the various embodiments unless otherwise stated. As described, a user may desire to provide a listing of a product to an electronic marketplace. In some situations, the user may desire to include information associated with the product, such as a title of the product, a description of the product, and the like. Further, the user may desire a high quality image of the product for display, as may include an image with balanced color and brightness as well as an image cropped and centered around the object of interest to the user.

Accordingly, approaches herein can at least include an image capture stage, an image processing stage, a text scanning/recognition stage, a text input stage, and a product submission stage. During the image capture stage, a user can use a camera of a computing device (e.g., a mobile phone, table, wearable computer, etc.) to acquire 502 an image of an object. During the image processing stage, the image can be processed 504 using one or more image processing algorithms, as may include image editing, segmentation, cropping, and contrast enhancement algorithms, among others, to improve the appearance of the acquired image. The processed image can be analyzed during the text scanning/recognition stage using one or more object character recognition (OCR) algorithms to recognize 506 text in the image. Various other objects or content can be identified as well, such as barcodes, product labels, product names, etc.

An interface such as a word listing interface can be provided 508 that includes a selectable list of at least a subset of the recognized text based at least in part on a relevance score associated with each word or some other ordering approach. The interface can be a popup window, an overlay, a new page, or the like, containing the selectable subset of words. In one example, a relevance score can be used to rank or prioritize the words for display. The relevance score can be determined based at least in part on recognized product references, brand names, stated user preferences, user browser history, user purchase history, a number of occurrences of a particular noun, and the like. Stop words can also be filtered out and omitted from display to the user.

The recognized text can be enabled 510 to be selected by the user to fill in at least one text field of a plurality of text fields. As described, the words included in the word listing interface can be associated with one of the text fields. For example, a drop down menu can show the available text fields and for a particular text field a set of associated words can be displayed. In this way, during the text input stage, the identified text can be selected and used to fill in a number of fields useful for selling or otherwise providing the object as well as related text to an electronic marketplace. For example, in the situation where the object is a product to be listed in an electronic marketplace, the recognized text can be used to fill in a title field, a search term field for the product, a product description field, etc. Thereafter, during the product submission stage, the device enables 512 a user to provide the image as well as any text to an electronic marketplace, application, and/or system.

Figure 6:
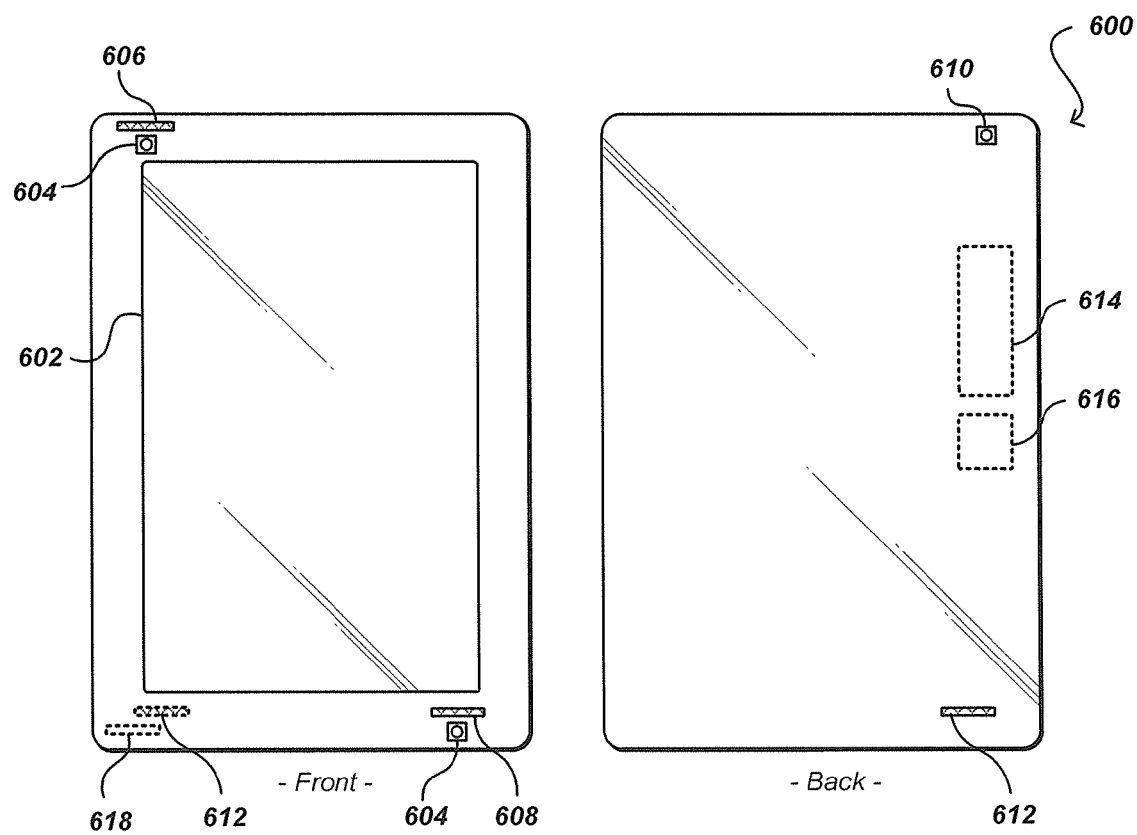
FIG. 6 illustrates an example device that can be used to implement aspects of the various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled component (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device).

Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such component. Various other elements and/or combinations are possible as well within the scope of various embodiments.

Figure 7:
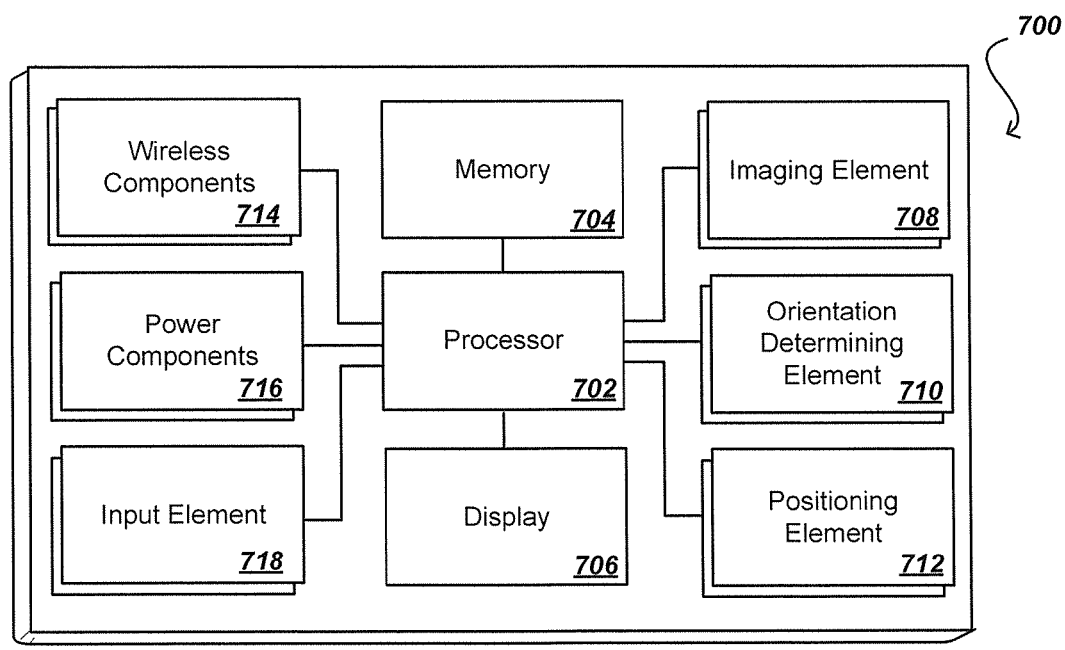
FIG. 7 illustrates example components of a client device such as that illustrated in FIG. 6.

FIG. 7 illustrates a set of basic components of an electronic computing device 600 such as the device 700 described with respect to FIG. 6. In this example, the device includes at least one processing unit 702 for executing instructions that can be stored in a memory component or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 718 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
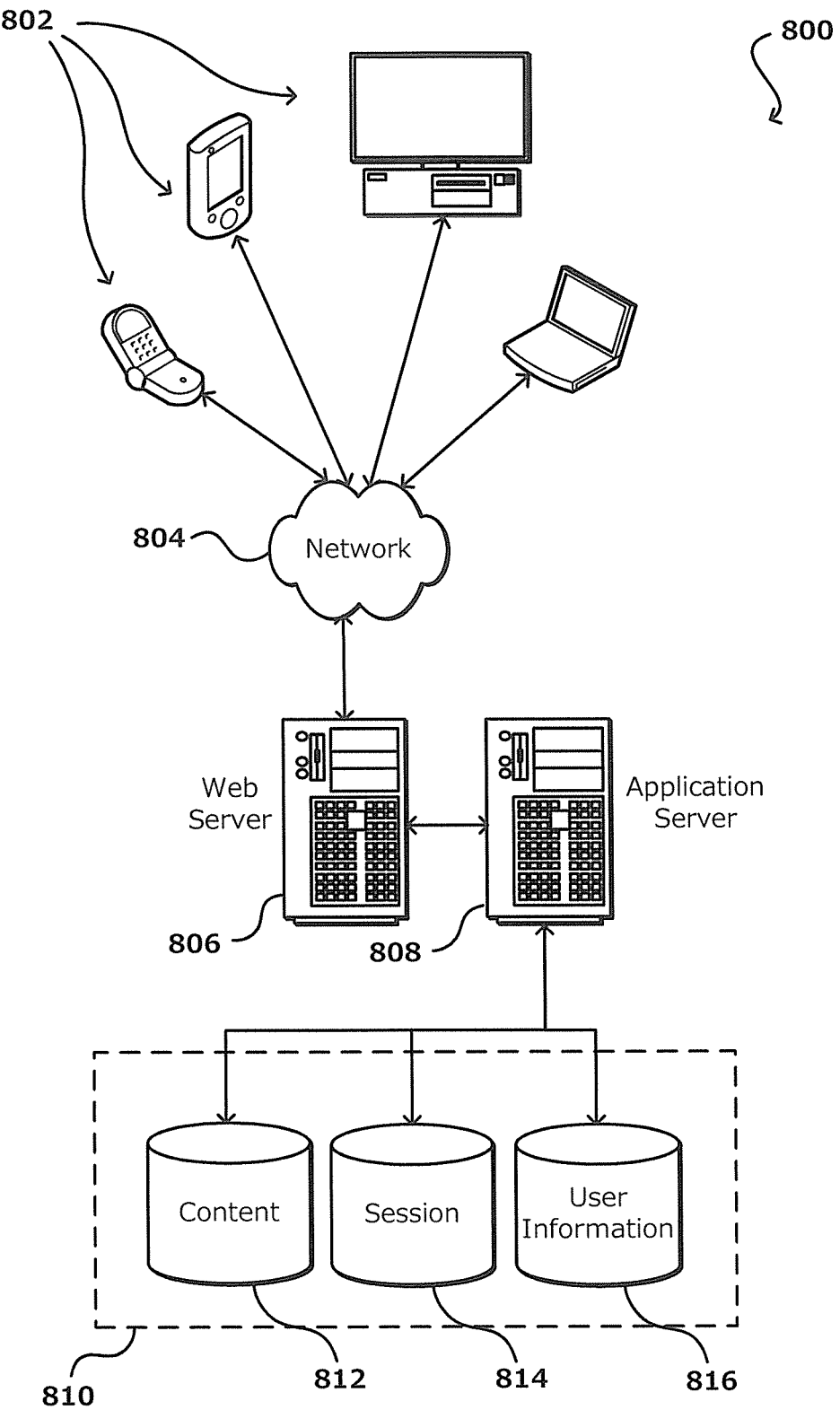
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 818, 820, 822, and 824, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 818, 820, 822, and 824 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 818, 820, 822 and 824. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a first camera;
    a second camera separated a distance from the first camera;
    a display element;
    at least one processor; and
    a memory device including instructions that, when executed by the at least one processor, cause the computing device to:
        capture first image data of an object by the first camera, the object including text displayed on a surface of the object;
        capture second image data of the object by the second camera;
        process the first image data to recognize the text displayed on the surface of the object;
        determine a set of words from the recognized text;
        generate using the first image data and the second image data a three-dimensional representation of the object;
        display an interface that includes a selectable list of a subset of the set of words; and
        enable selection of a word from the selectable list to be displayed with the three-dimensional representation of the object.

2. The computing device of claim 1, wherein the instructions, when executed to process the first image data, further cause the computing device to:
    determine a foreground region of the first image data and a background region of the first image data;
    identify a representation of the object;
    determine that the representation of the object is in the foreground region; and
    crop the background region from the first image data.

3. The computing device of claim 1, wherein the instructions, when executed, further cause the computing device to:
    receive a selection of a text input field being displayed on the interface;
    receive a selection of a word from of the selectable list; and
    populate the text input field with the word, wherein the text input field includes at least one of a title field, a product description field, a product search phrases field, a keyword search field, a price field, a quantity field, or a quality field.

4. The computing device of claim 3, wherein the instructions, when executed, further cause the computing device to:
    receive an indication that input to the text input field is complete; and generate a product listing using entries in the text input field.

5. The computing device of claim 4, wherein the instructions, when executed, further cause the computing device to:
provide, to an electronic marketplace, the product listing and information corresponding to the three-dimensional representation of the object.

6. The computing device of claim 1, wherein the instructions, when executed, further cause the computing device to:
cause the computing device to perform one of submitting a product listing to an electronic marketplace, copying the selection of the word to a clipboard, a notepad, or a browser, or storing the three-dimensional representation of the object or the selection of the word to a database.

7. The computing device of claim 1, wherein the instructions, when executed, further cause the computing device to:
identify words of the subset of the set of words matching a noun;
for each word of the subset of the set of words matching a particular noun, determine a number of occurrences of the particular noun;
determine a relevance score for each word of the subset of the set of words based at least in part on the number of occurrences of a matched particular noun; and
arrange the subset of the set of words based at least in part on a respective relevance score for each word.

8. The computing device of claim 1, wherein the instructions, when executed, further cause the computing device to:
process the first image data and the second image data to adjust at least one of image sharpness, image color, image brightness, image file size, image orientation, image rectification, or image scaling.

9. The computing device of claim 1, wherein the instructions, when executed, further cause the computing device to:
acquire third image data, the third image data including a view of the object that is different from the first image data and the second image data;
analyzing the third image data to determine a second set of words; and
display an interface that includes a selectable list of at least a subset of the second set of words.

10. The computing device of claim 1, wherein the instructions, when executed, further cause the computing device to:
acquire a plurality of images, each image of the plurality of images including at least a portion of a representation of the object; and
determine, based at least in part on the plurality of images, at least one of two or more views of the object, each view of the two of more views being acquired from a different point of view, or physical dimensions of the object.

11. A computer-implemented method, comprising:
capturing first image data of an object by a first camera of a computing device, the object including text displayed on a surface of the object;
capturing second image data of the object by a second camera of the computing device;
processing the first image data to recognize the text displayed on the surface of the object;
determining a set of words from the recognized text;
generating using the first image data and the second image data a three-dimensional representation of the object;
displaying an interface that includes a selectable list of a subset of the set of words; and
enabling selection of at least one word from one of the selectable list to be displayed with the three-dimensional representation of the object.

12. The computer-implemented method of claim 11, further comprising:
determining a foreground region of the first image data and a background region of the first image data;
identifying a representation of the object;
determining that the representation of the object is in the foreground region; and
cropping the background region from the first image data.

13. The computer-implemented method of claim 11, further comprising:
receiving a selection of a text input field displayed on the interface;
receiving a selection of a word from of the selectable list; and
populating the text input field with the word, wherein the text input field includes at least one of a title field, a product description field, a product search phrases field, a keyword search field, a price field, a quantity field, or a quality field.

14. The computer-implemented method of claim 13, further comprising:
receiving an indication that input to the text input field is complete;
generating a product listing being based at least in part on entries in the text input field; and
providing, to an electronic marketplace, the product listing and information of the three-dimensional representation of the object.

15. The computer-implemented method of claim 11, further comprising:
causing the computing device to perform one of submitting a product listing to an electronic marketplace, copying the selection of the word to a clipboard, a notepad, or a browser, or storing the three-dimensional representation of the object or the selection of the word to a database.

16. The computer-implemented method of claim 11, further comprising:
identifying words of the subset of the set of words matching a noun;
for each word of the subset of the set of words matching a particular noun, determine a number of occurrences of the particular noun;
determining a relevance score for each word of the subset of the set of words based at least in part on the number of occurrences of a matched particular noun; and
arranging the subset of the set of words based at least in part on a respective relevance score for each word.

17. A non-transitory computer readable storage medium storing one or more sequences of instructions executable by one or more processors to perform a set of operations comprising:
capturing first image data of an object by a first camera of a computing device, the object including text displayed on a surface of the object;
capturing second image data of the object by a second camera of the computing device;
processing the first image data to recognize the text displayed on the surface of the object;
determining a set of words from the recognized text;
generating using the first image data and the second image data a three-dimensional representation of the object;
displaying an interface that includes a selectable list of a subset of the set of words; and
enabling selection of at least one word from one of the selectable list to be displayed with the three-dimensional representation of the object.

18. The non-transitory computer readable storage medium of claim 17, further comprising instructions executed by the one or more processors to perform the set of operations of:
   acquiring a plurality of images, each image of the plurality of images including at least a portion of a representation of the object; and
   determining, based at least in part on the plurality of images, at least one of two or more views of the object, each view of the two of more views being acquired from a different point of view or physical dimensions of the object.

19. The non-transitory computer readable storage medium of claim 17, further comprising instructions executed by the one or more processors to perform the set of operations of:
   determining a foreground region of the first image data and a background region of the first image data;
   identifying a representation of the object;
   determining that the representation of the object is in the foreground region; and
   cropping the background region from the first image data.

20. The non-transitory computer readable storage medium of claim 17, further comprising instructions executed by the one or more processors to perform the set of operations of:
   receiving a selection of a text input field displayed on the interface;
   receiving a selection of a word from of the selectable list; and
   populating the text input field with the word, wherein the text input field includes at least one of a title field, a product description field, a product search phrases field, a keyword search field, a price field, a quantity field, or a quality field.

* * * * *